April 28, 1959  F. W. E. HOESELBARTH  2,884,013
TEXTURING DUE TO OVERLAPS
Original Filed May 17, 1954  9 Sheets-Sheet 1
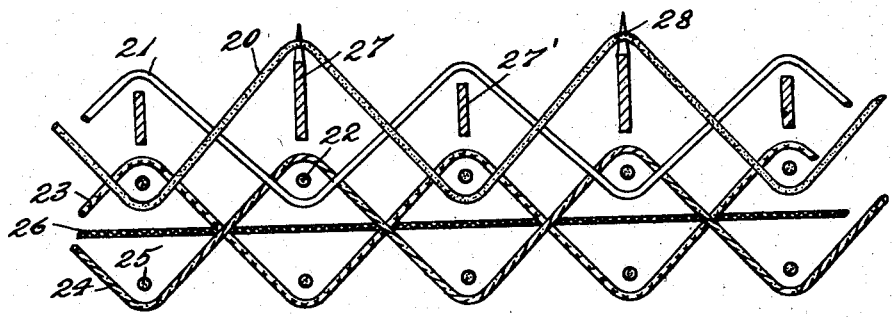
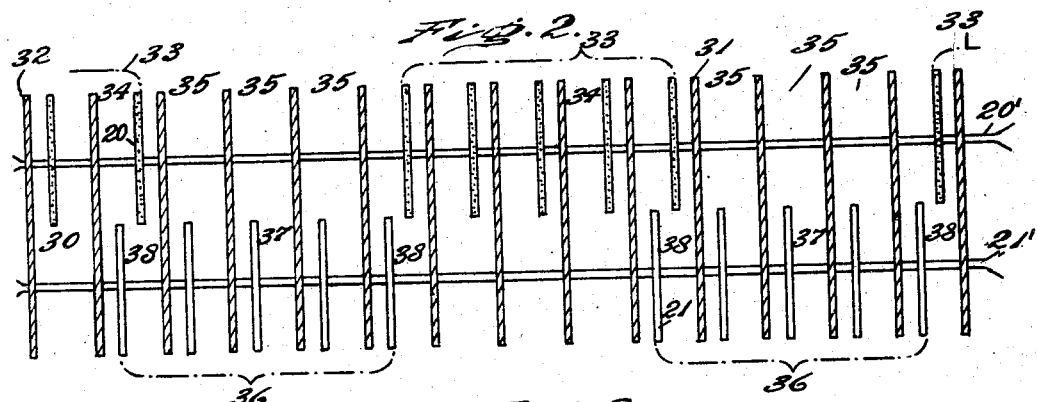
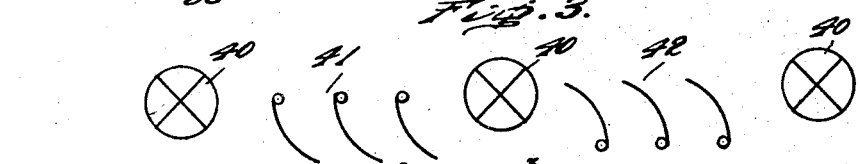
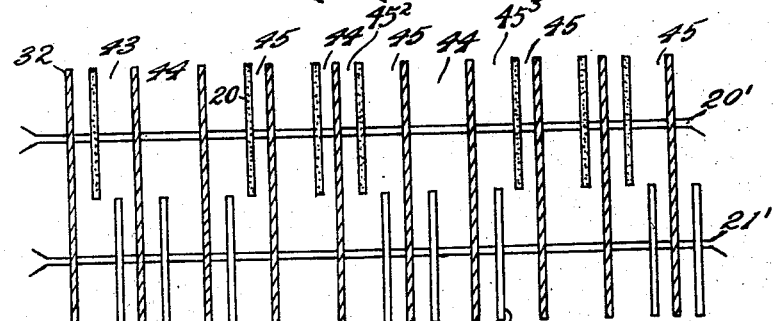
Inventor
Frank W. E. Hoeselbarth
By  Attorneys.

April 28, 1959  F. W. E. HOESELBARTH  2,884,013
TEXTURING DUE TO OVERLAPS
Original Filed May 17, 1954  9 Sheets-Sheet 2
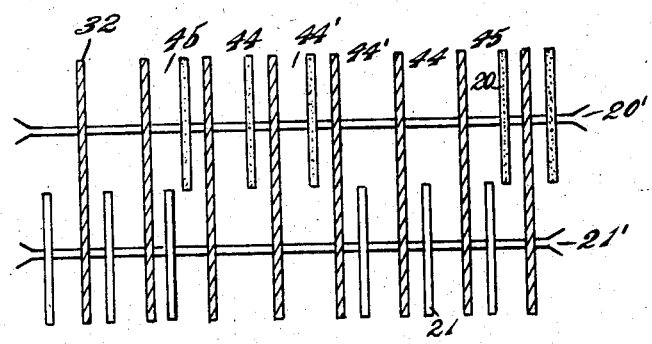
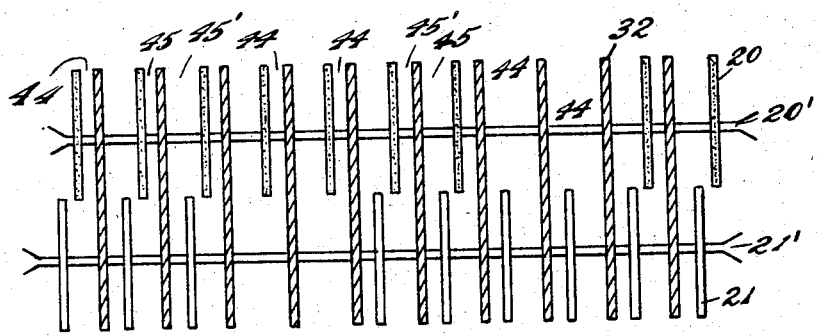
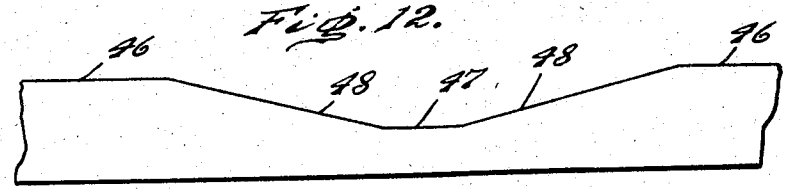
INVENTOR
Frank W.E. Hoeselbarth.
BY
ATTORNEYS.

April 28, 1959     F. W. E. HOESELBARTH     2,884,013
TEXTURING DUE TO OVERLAPS

Original Filed May 17, 1954     9 Sheets—Sheet 4

INVENTOR.
Frank W. E. Hoeselbarth
BY
ATTORNEYS

INVENTOR
Frank W. E. Hoeselbarth
BY
ATTORNEYS.

�# United States Patent Office 2,884,013
Patented Apr. 28, 1959

2,884,013

TEXTURING DUE TO OVERLAPS

Frank W. E. Hoeselbarth, Carlisle, Pa., assignor to C. H. Masland & Sons, Carlisle, Pa., a corporation of Pennsylvania Original application May 17, 1954, Serial No. 430,295. Divided and this application March 16, 1955, Serial No. 494,756

13 Claims. (Cl. 139—39)

The present invention relates to pile fabrics such as carpets and rugs in which textured effects on the surface of the pile are obtained by special thread-ins using two or more pile warps.

The present application is a divisional of my copending application Serial No. 430,295, filed May 17, 1954 for Texturing Due to Overlaps, relating to the pile fabrics.

A purpose of the invention is to create textured effects in pile fabrics such as carpets and rugs by establishing empty spaces in the pile, the pile remote from the empty spaces remaining oriented warpwise, and the pile adjacent to the empty spaces being crowded toward the empty spaces and thus turned or rotated to create texturing effects.

A further purpose is to weave a pile fabric using two or more pile warps in the face of the fabric according to the velvet or tapestry system, and to obtain unusual effects by threading in a series of groups of ends of a first warp in adjoining dents, with dislocations between the groups of ends-in, and a series of ends of a second warp in adjoining dents, with dislocations in dents between groups of ends-in, dents at the sides of groups of the first warp corresponding to dents at the middle or an interior position of groups of the second warp.

A further purpose is to secure distributions of mass of pile by a combination of differences in wire height, straightness or waviness, cutting or noncutting character, or other wire-imposed characteristic, on the one hand, and orientation of zones of upstanding ends of two or more pile warps concentrated, and intermediate over-hanging pile extending from one row to the next where pile ends are sparse.

A further purpose is to place pile A in a locally relatively concentrated relationship by bringing ends of pile A locally more close together in adjoining courses than elsewhere in the pile (reversing the left to right relation to pile B) or by keeping an end of pile A and an end of pile B in each such course, when an end of pile A or pile B is omitted in some other course.

A further purpose is to attenuate pile A locally at a particular course or courses by omitting pile A in the particular course or by spacing it more widely from pile B by reversing the order from left to right of ends of pile A and pile B in adjoining courses.

A further purpose is to cut ends of one of two or more pile warps woven in opposition by one wire, and when the next wire raises the same ends of the same pile warp to pull out the cut ends and expose them at the face of the fabric by the inclined portions in the shed on a wavy wire.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a warpwise conventional weave diagram showing one example of a weave which may be employed in the present invention.

Figure 2 is a transverse thread-in or draw-up diagram showing the ends-in and the ends-out in particular dents for each of two pile warps. These and other thread-in diagrams omit from each dent the binder warp ends and stuffer warp ends.

Figure 3 is a diagrammatic plan view showing the distribution of zones of overlapping pile warp ends and zones of pile warp ends overhanging from one row to the next.

Figure 4 is a transverse thread-in or draw-up diagram showing the pile warps arranged in groups of three ends rather than in groups of five ends as in Figure 2.

Figure 5 is a transverse thread-in or draw-up diagram showing the warps arranged in groups of three ends with overlapping only at one end of each group, whereas in the other forms the overlapping is at both ends.

Figure 6 is a transverse thread-in or draw-up diagram showing overlapping in two dents at each end of each group, whereas in other forms the overlapping is only in one dent.

Figure 7:
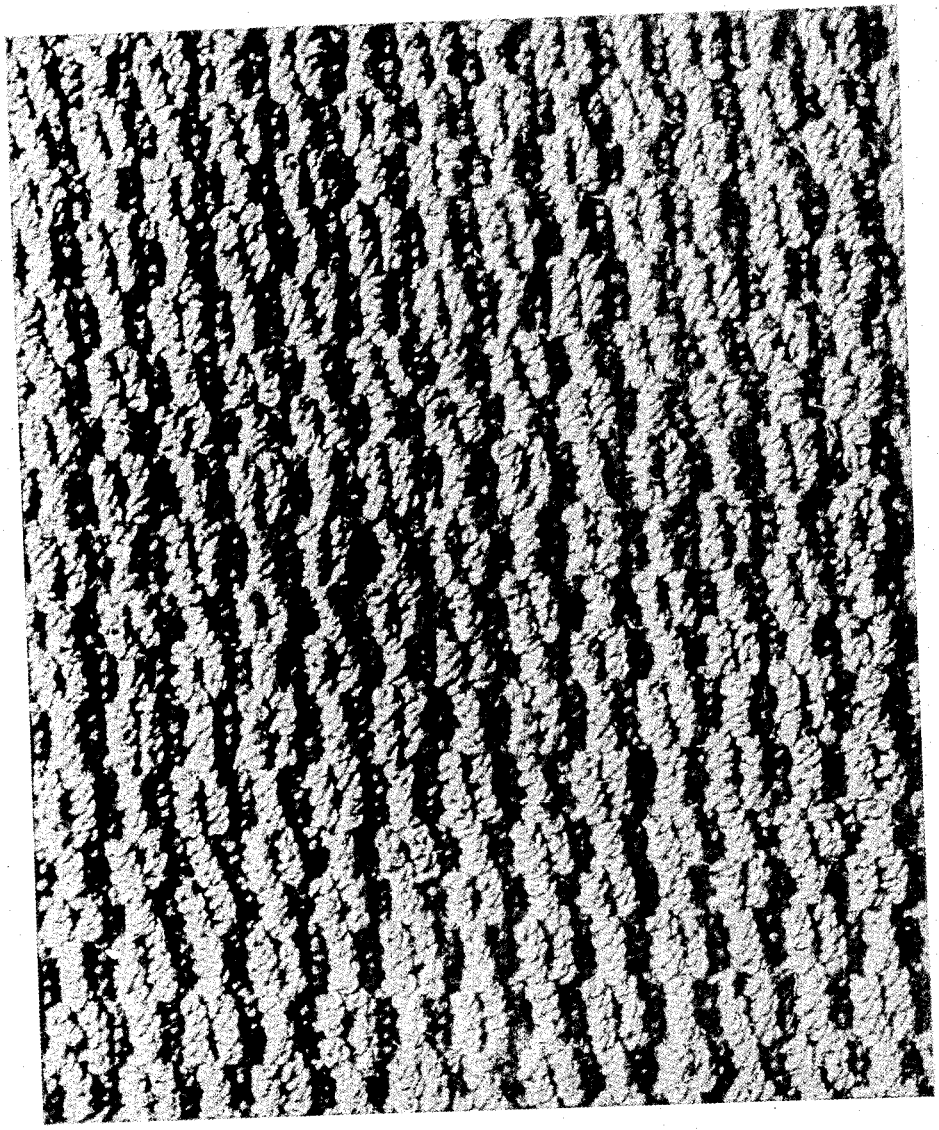

Figure 7 is a photograph showing the face of a weave in which the groups on one warp contain five ends and those on the other warp show four ends, all wires are straight and non-cutting, the high wires have a height of 0.290 inch and the low wires have a height of 0.130 inch, and the sequence of wires in the wire set runs two low wires in sequence, three high wires in sequence, then repeat with two low wires in sequence, etc.

Figure 8:
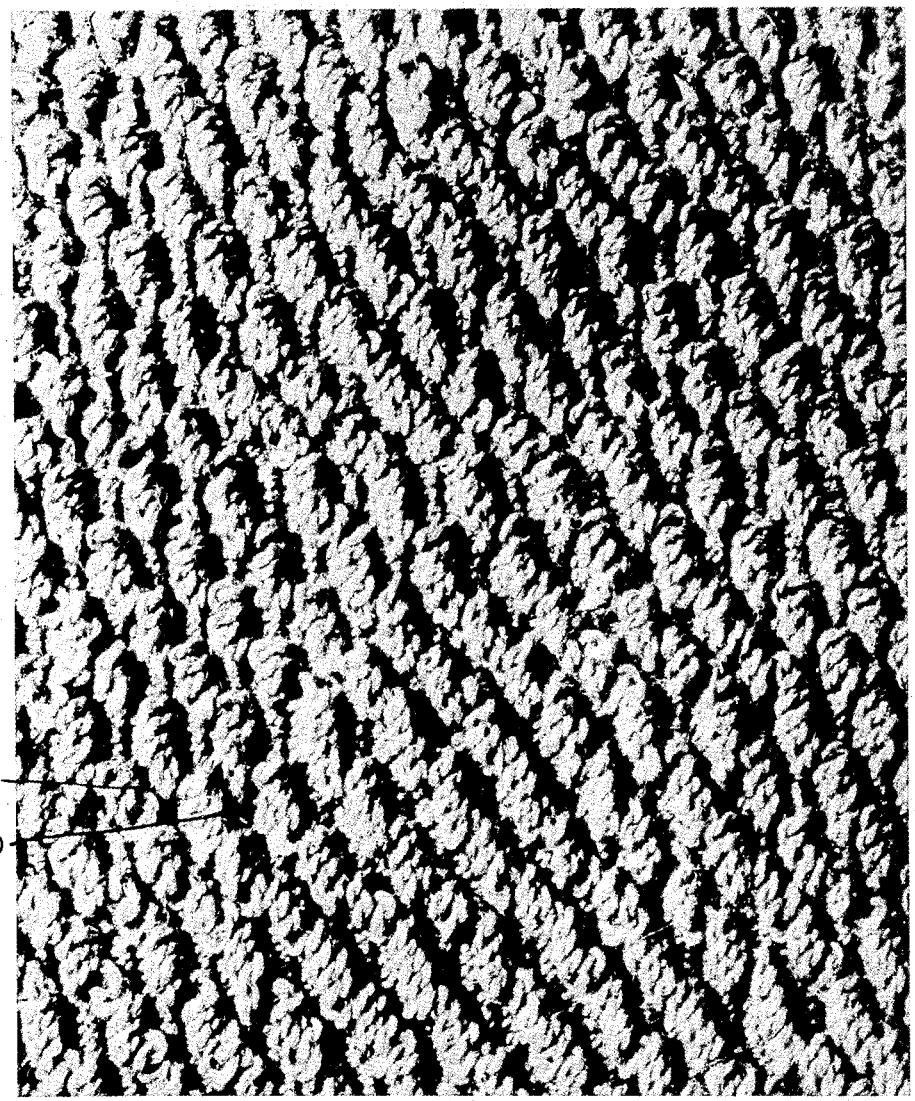

Figure 8 is a photograph of the face of a fabric according to the invention in which the groups of ends for each of the two pile warps include respectively five and four ends, all wires are straight and noncutting, the high wires have a height of 0.500 inch, the low wires have a height of 0.130 inch and the sequence of wires runs two low wires in succession, one high wire, then repeat with two low wires in succession, etc.

Figure 9:
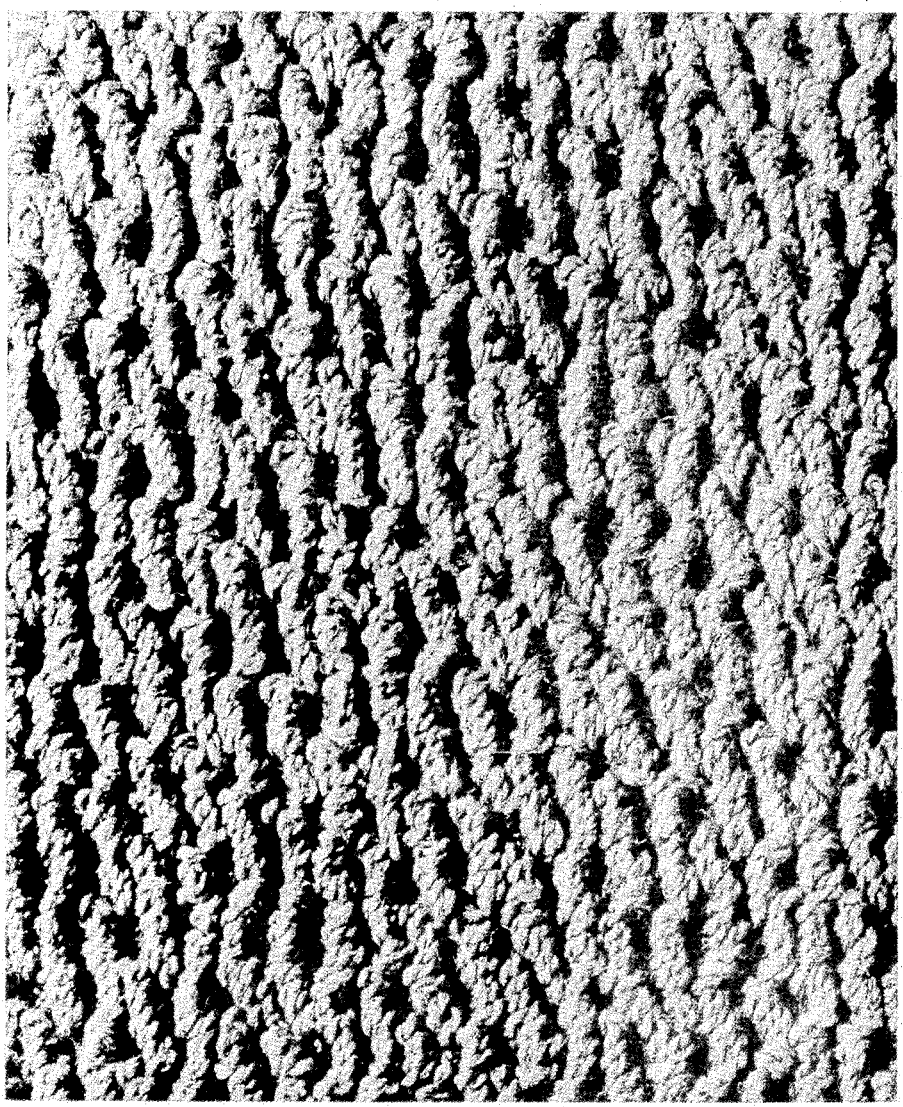

Figure 9 is the photograph of the face of fabric in accordance with the invention in which the groups and the wires are as in Figure 8, and the sequence of wires runs two high wires in succession, one low wire in succession, and then repeat with two high wires in succession, etc.

Figure 10:
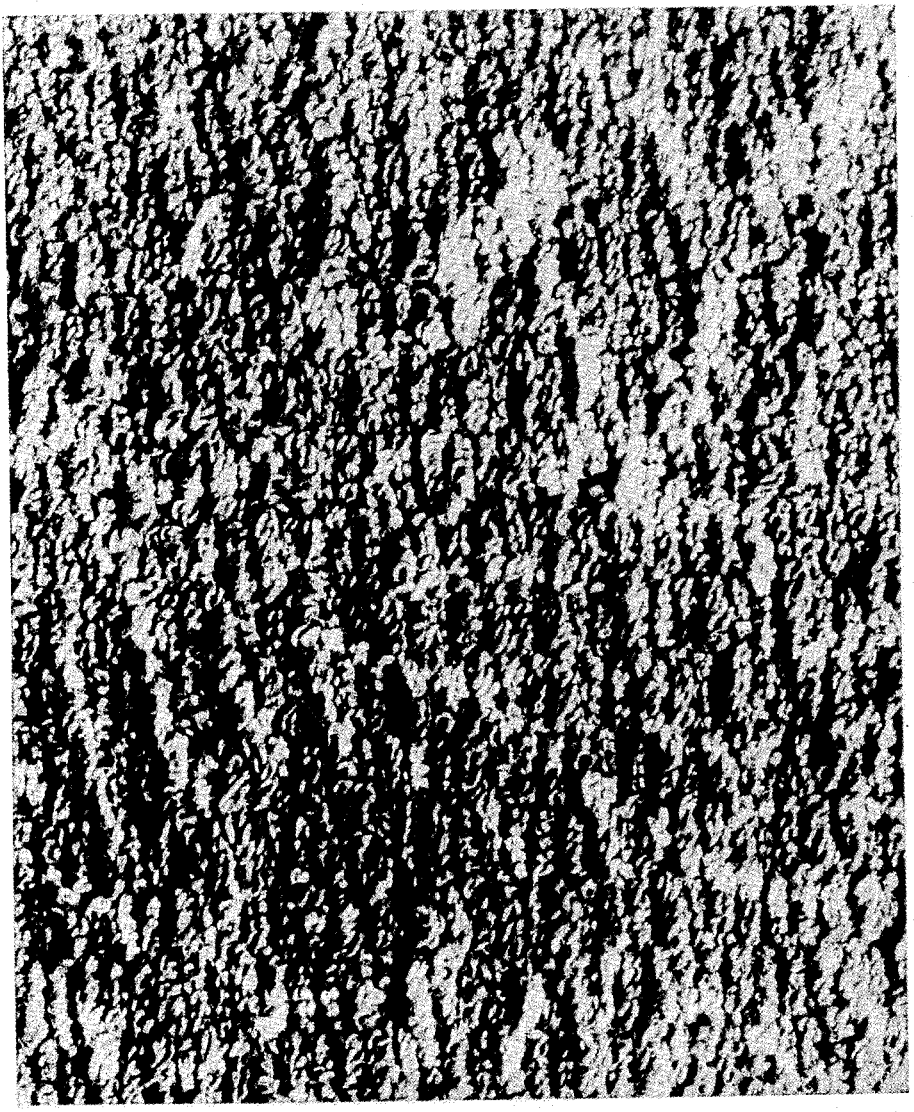

Figure 10 is a photograph showing the face of a fabric woven according to the invention using all noncutting wavy wires, the high portions having a height of 0.323 inch and the low portions a height of 0.130 inch. There are five pile warp ends in each group on each of the two pile warps. The pile wires are used in sequence according to a pattern as shown.

Figure 11:
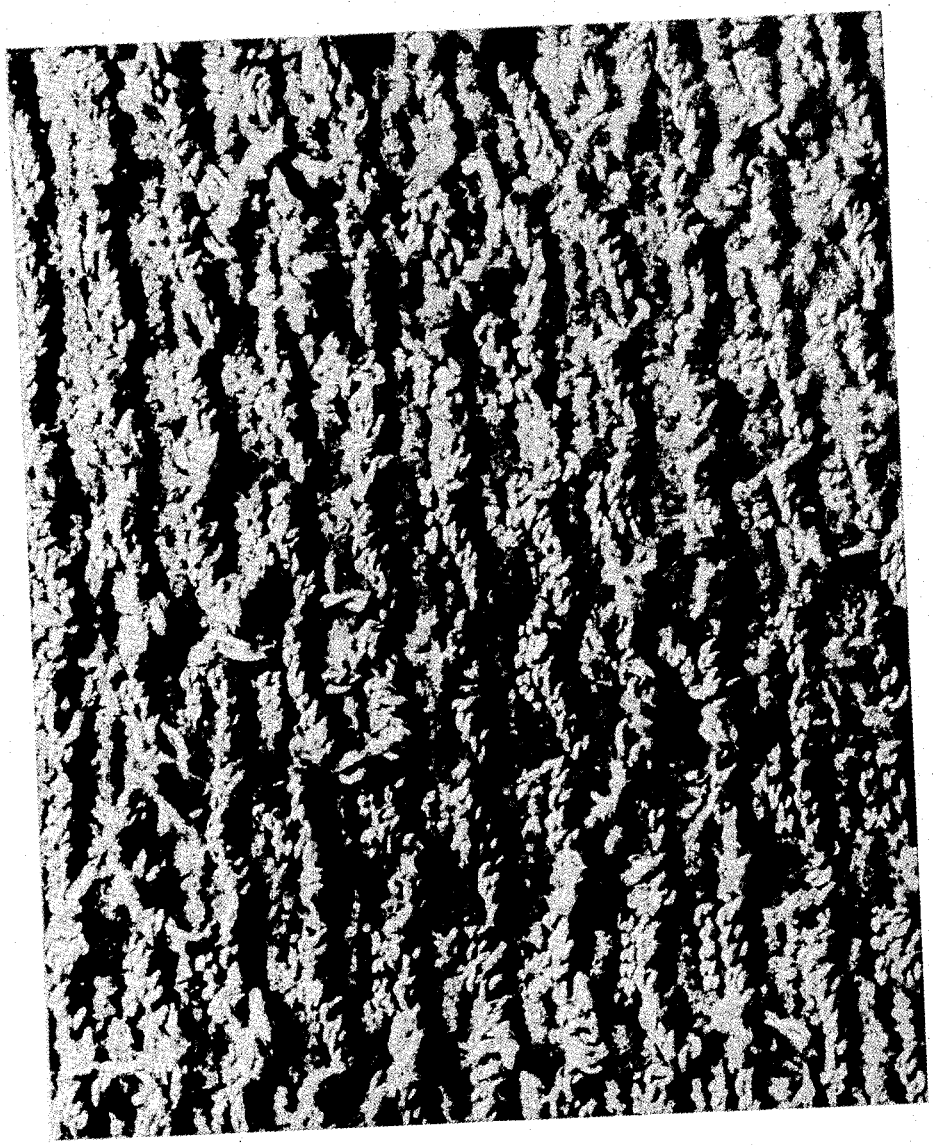

Figure 11 shows the face of a pile fabric according to the invention which is woven from two pile warps with five ends in each group. The wires used are wavy noncutting wires having high portions of 0.323 inch and low portions of 0.130 inch, and straight cutting wires of height of 0.130 inch. The sequence used is two wavy noncutting wires, two straight cutting wires, one wavy noncutting wire and then one straight cutting wire, followed by the repeat. At many points as shown, the low portions of the wavy wire have pulled-out portions which were previously cut by a cutting wire due to the fact that the same pile warp is then raised over a wavy noncutting wire.

Figure 12 is a fragmentary side elevation of a wavy wire used in the invention.

Figures 13, 14, 15 and 16 are transverse thread-in or draw-up diagrams showing groups in which the relative right and left hand relationships of ends of pile warp A to pile warp B in an individual dent differs in some cases at different positions in the group, for example, between the middle and one end of between opposite ends.

Figure 13:
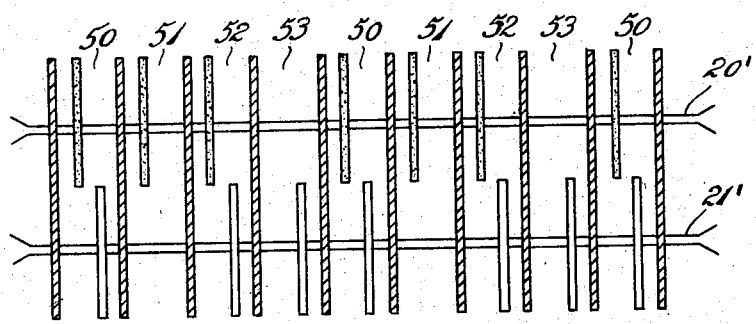
Figure 17:
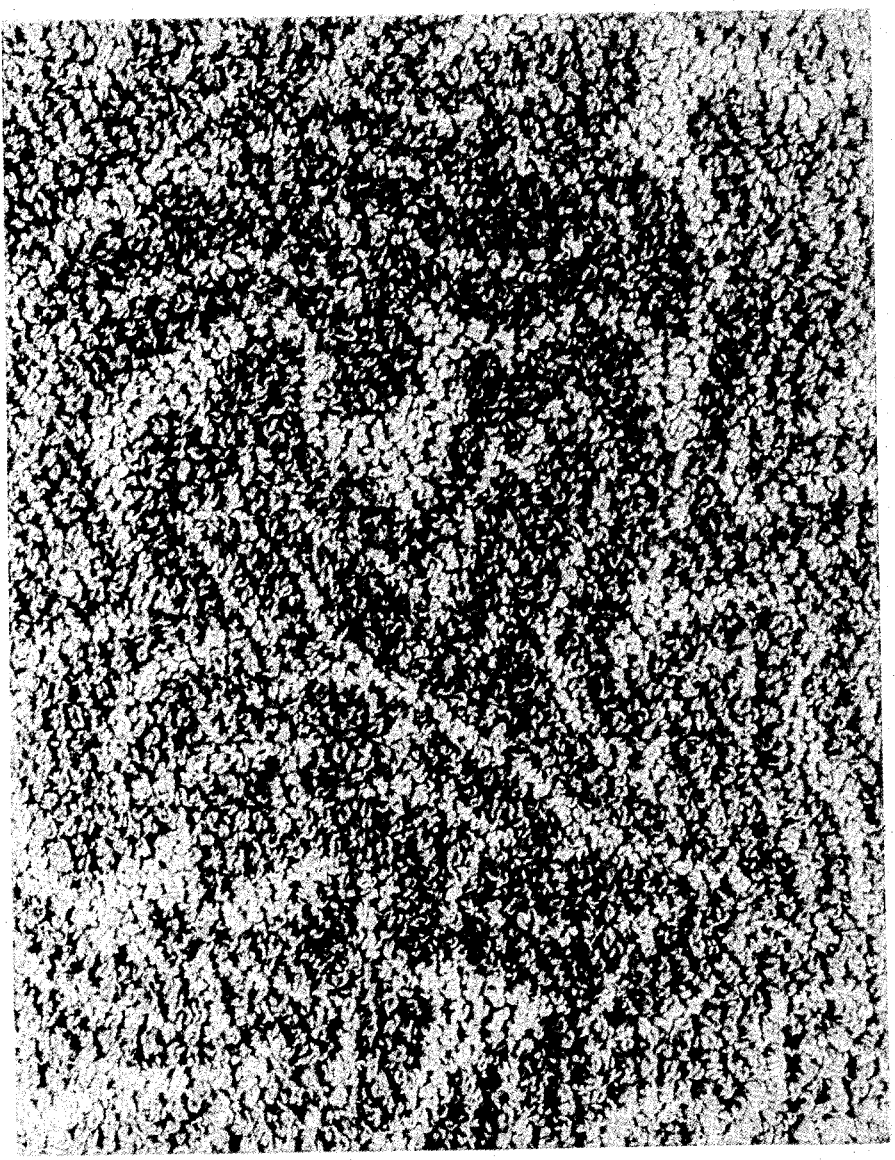

Figure 17 is a photograph showing the face of a weave according to Figure 13.

Figure 18:
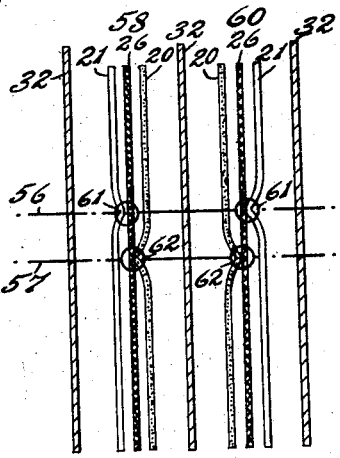

Figure 18 is a diagrammatic top plan view showing the relationship between respective pile warp ends involved in creating a condition of lateral crowding.

In Figures 2, 4, 5, 6, 13, 14, 15 and 16, lines 20' and 21' indicate the condition of the thread-in with respect to pile warp set 20 and pile warp set 21 as the case may be.

In the drawings like numerals refer to like parts throughout.

In accordance with prior developments of the present inventor, textured effects at the face of a pile fabric have been obtained by weaving two or more pile warps raised successively over wires, and employing ends-in of a particular warp at dents at which ends are out of another pile warp.

In accordance with the present invention, improved textured effects are obtained by creating a series of zones of straight pile due to concentration of a particular pile A with intermediate zones of pile which falls over into the next transverse row because ends of pile A are scarce. The invention can be employed where two or more pile warp ends are in each group, it being understood that the number of pile warp ends in the groups of a particular warp may be the same throughout or different throughout, and may be the same or different from the number of pile warp ends in the groups of the cooperating pile warp or pile warps. It is likewise possible to overlap the groups in the different pile warps to the extent of only a single dent or to the extent of two more dents. Likewise the overlapping may take place at one or both sides of the groups.

The groups in pile warp A and in pile warp B are characterized by the existence of areas of crowding across the fabric. In some cases the areas of crowding are created by ends-out between the groups. In other cases the groups are separated by differences in the right and left hand relationships of an end of pile warp A with respect to an end of pile warp B in the same dent in different parts of the group.

The concept of differences in right and left hand relationship of pile warp A and pile warp B will be best understood by reference to Figure 18 which shows two courses divided by splits 32 which of course extend vertically, but for convenience in illustration are here extended longitudinally in plan. In each of the dents 58 and 60 there appear ends of stuffer warp 26 and of pile warp 20 and pile warp 21. The stuffer warp is threaded through bottom long slots of heddle frames 56 and 57, while the ends of pile warp 21 are carried through relatively upper eyes 61 on heddle frame 56 and the ends of pile warp 20 are carried through relatively upper eyes 62 on heddle frame 57. The stuffer warp 26 is relatively straight. In dent 58 as viewed in Figure 18 pile warp end 20 is on the right and pile warp 21 is on the left, and the relatively heavily tensioned stuffer warp end is between. In dent 60 on the other hand pile warp 20 is on the left and pile warp 21 is on the right with the relatively heavily tensioned stuffer warp end between.

In other cases, the groups are separated by a combination of ends-out and differences in the right and left hand relationships of an end of pile warp A with respect to an end of pile warp B in the same dent in different parts of the group. Thus, the change in right and left hand relationship may be between the middle and one end or between one end of the group and the other end of the group as illustrated herein.

Figure 1 illustrates one of many weaves to which the invention may be applied, it being understood that it is immaterial from the standpoint of the present invention whether there be a single binder warp woven in opposition to the stuffer warp or a pair of opposed binder warps, and it is also immaterial whether the weave is a V weave, a W weave, or any other suitable pile fabric construction.

It is likewise immaterial whether two, three or any other number of pile warps are successively raised in the pile according to the Carlisle weave (cam operated multiple pile warp carpet loom).

As seen in Figure 1, pile warp 20 is woven in opposition to pile warp 21, pile warp 20 being locked below every alternate face weft 22, and pile warp 21 being locked below the intermediate face wefts. The backing of the fabric is constructed by opposed binder warps 23 and 24 woven around face wefts 22 and back wefts 25, with a stuffer warp 26 extending between the face and back wefts.

The successive pile warps 20 and 21 are raised over wires 27 and 27' which will preferably be different, and may successively differ as to the character of wires raising each pile warp as later explained. The differences between the wires 27 and 27' will suitably be in any one or any combination of the following features:

(1) Height of straight or noncutting wires.

(2) High and low variant character of the top of the wires.

(3) Cutting or noncutting character of the wire.

(4) Relationship between the character of a particular wire and the wire which last previously raised the same pile warp.

(5) Relationship between the character of a particular wire and the immediately preceding wire which raised the other pile warp.

To illustrate this difference, wires 27 show optional cutters 28 applied at the ends opposite to the heads.

Figure 2 is a draw-up or thread-in diagram according to the invention, showing a series of dents 30 of the reed 31 separated by splits 32 and each defining a course in the weaving of the fabric. A line 20 is extended across the diagram to show the ends which correspond with the pile warp 20, it being evident that they are arranged in groups 33, in this case having five members in each group, and occupying five adjoining dents. In between each group 33 contained in dents 34 which are occupied by ends of the pile warp 20, there are dents 35 which have ends-out or contain no pile warp ends of the pile warp 20. The number of these unoccupied dents 35 depends upon the number of ends in the groups of the succeeding pile warp 21. Pile warp 21 has ends which are shown by their crossing the line 21 in Figure 2. Groups of ends 36, in this case five in number, are placed in adjoining dents 37, the intermediate dent or dents of which correspond to the dents 35 which are unoccupied by the pile warp 20. However, the side dents 38 occupied by the groups 36 of pile warp 21 are also occupied by ends of the groups 33 of pile warp 20. Thus we have in the middle of each of the groups ends which are alone in their dents as far as the pile warps are concerned, but at the sides there are overlaps or dents occupied by both pile warps.

If you examine the condition created in the fabric as suggested diagrammatically in Figure 3, and by reference also to Figure 8, it will be noted that areas of sparsity of pile are created at 40, and that there is a tendency for pile 41 and 42 adjoining these areas to expand and rotate, while pile at more remote positions is less influenced. This creates a very novel and attractive textured effect on the face of the fabric.

The invention is applicable with any desired number of ends in the particular groups greater than two. Thus Figure 4 shows a series of dents 43 in which pile warp 20 has three ends in each group and pile warp 21 has three ends in each group. The intermediate end in each group is in a dent 44 which corresponds with an end-out in the other pile warp, but the sidemost ends of each group are in dents 45 which have ends of both groups and therefore create upstanding pile.

Figure 4 illustrates a feature which is significant in respect to the texturing effect. Considering the group of ends 39 of pile warp 21, it will be noted that in dent 45² at one side of the group 39 the end of pile warp 20 is to the left of the end of pile warp 21 in the dent, but at the right side of the group 39 in dent 45³ to the end of pile warp 20 is to the right of the end of pile warp 21. There is thus a reversal of the right and left hand relationships of the pile warp ends in the dent between the opposite sides of the group. The same effect occurs all the way across the fabric. This serves to produce a less intense texturing, but contributes to the distinction between one group and the next.

The invention is also applicable with overlap only at one side of each group rather than at both sides as shown in Figure 5. In this form, there are three ends in each group of pile warp 20 and of pile warp 21. The middle end of each group is in a dent 44 where there is an end-out of the other group, the one endmost end is in a dent 45 which has an end of both pile warps and therefore has overlap, but the other sidemost end of each group is in a dent 44¹ which has an end-in of one warp and an end-out of the other pile warp and therefore has no overlap.

The invention is also applicable to cases in which the overlap covers two or more dents rather than only one dent as long as there are intermediate dents of each group without overlap. Thus in Figure 6 there are six pile warp ends in each group. Intermediate ends are in dents 44 which have an end of one pile warp but no end of the other pile warp. At the sides of each group there are two dents 45 and 45¹ which have an end of each pile warp in the particular dent.

The possible effects are illustrated in Figures 7 to 11 inclusive, which show combinations of upstanding and overlying pile.

Figure 7, as earlier explained, employs a combination of high and low straight, noncutting wires, with different numbers of ends in the groups of the particular pile warps (respectively 5 and 4). It will be noted that the high pile is displaced out of the straight row and into the next row in a series of scroll formations which are most attractive.

In Figure 8 the high pile is actually distorted into a diagonal formation by the effect of the overlap and the ends-out. Pronounced lining effects, however, are broken up and an attractive appearance is obtained.

In Figure 9, again using uncut pile as in the other figures, the sequence is such as to shift a particular pile from the high wires to the low wires and back again, using two pile warps.

Figure 10 employs wavy wires in a noncutting construction, and the variation in heights due to the wires are accented by the effect of crowding particular pile projections over into adjoining transverse rows.

In Figure 11 there is a combination of cut and uncut pile projections, but due to the fact that the wire shifts at a particular pile warp from one type of wire to another, a particular warp which has been cut to form low cut pile in one transverse row appears over a noncutting wavy wire the next time it is raised in the fabric and the pulling of the wavy wire completely pulls some of the ends out, leaving abnormally long tufts sticking out which enhance the appearance, and are in the same row with loops. Those loops woven over high portions 46 of the wavy wire (Figure 12) are not pulled out, but only those woven over relatively low portions 47 or lower parts of inclined portions 48.

Figures 13 to 16 indicate the results which can be achieved in texturing by shifting in some cases the relative right and left hand position of the ends of pile warps 20 and 21 in the dent at different positions in the groups.

Figure 14:
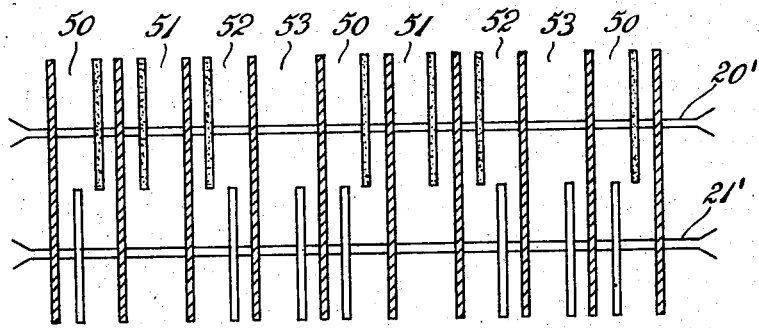

Figures 13 and 14 have the same number of ends per group, and the same number of ends-out between groups, but different left and right hand relationships of pile warp ends of pile warps 20 and 21 in an individual dent.

Considering first Figure 13, the dents may be designated for the present purposes as 50, 51, 52 and 53, the designations then repeating in new cycles of four dents across the loom. Individual ends of pile warps 20 appear in each case in dents 50, 51 and 52, while pile warp 21 has an end-out in dent 53. This same relationship occurs all the way across the fabric in the weftwise direction in a series of cycles.

The groups of three adjoining pile warp ends of pile warp 20 are staggered with respect to the groups of three adjoining pile warp ends of pile warp 21, so that the respective groups overlap at the ends, but the middle of each group is opposite an end-out of the adjoining group of the other pile warp. Therefore the ends-in of pile warp 21 appear in dents 52, 53 and 50, with an end-out in dent 51.

In the thread-in of Figure 13, wherever pile warp ends of pile warps 20 and 21 both appear in the same dent, the end of pile warp 21 is threaded-in to the right of the end of pile warp 20. This serves to divide up the groups of ends and give a texture which is more intense than that of Figure 14 discussed below. The photograph of Figure 17 shows the texture obtained in Figure 13, and illustrates clearly this effect.

In Figure 14, pile warp 20 has an end-in in each dent 50, 51 and 52 and an end-out in each dent 53, while pile warp 21 has an end-in in each dent 52, 53 and 50 and an end-out in each dent 51. At the left hand side of each group of pile warp 20 and at the right hand side of each group of pile warp 21, ends of these pile warps are present in dent 50, and the end of pile warp 20 is placed to the right of the end of pile warp 21. On the other hand, at the right hand side of each group of pile warp 20 and the left hand side of each group of pile warp 21, an end of pile warp 20 and an end of pile warp 21 are present in dent 52. In this case, the situation is just the reverse, and the end of pile warp 20 is to the left of the end of pile warp 21. The final effect is to contract the group and make the texture less intense.

Figure 15:
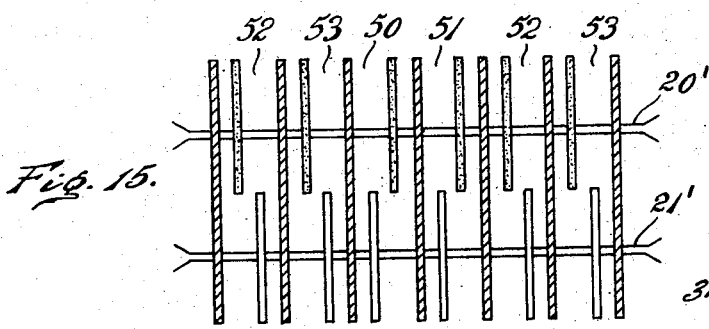

It is not, however, necessary in every case to employ ends-out between groups. Figure 15 illustrates a thread-in in which the ends of pile warp 20 which form the group are in dents 50, 51, 52, and 53, while the ends of pile warp 21 which form the groups are in dents 52, 53, 50 and 51. There are no ends-out between groups but a reversal occurs in right and left hand relationship. Thus at the left hand side of the group of pile warp 20, in dents 50 and 51, the end of pile warp 20 is to the right of the end of pile warp 21. At the right hand side of each group in pile warp 20, in dents 52 and 53, the pile warp end of pile warp 20 is to the left of the pile warp end of the pile warp 21. A similar situation exists in the groups of pile warp 21. Thus at the left hand side of the group in pile warp 21, in dents 52 and 53, the end of pile warp 20 is to the left of the end of pile warp 21. At the right hand side of the group in pile warp 20 in dents 50 and 51, the end of pile warp 20 is to the right of the end of pile warp 21. Thus in Figure 15 the groups are delineated by the change in the right and left hand relationship of the ends. While this shows the discontinuity separating groups of four ends, the same practice can be used to separate groups of 2, 3 or more ends without using ends-out between groups.

Figure 16:
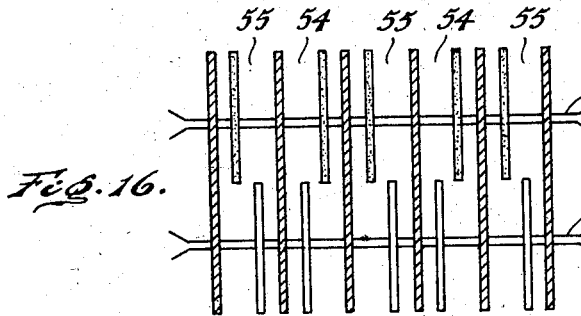

Figure 16 shows a construction having groups of two. The groups of pile warp 20 appear in dents 54 and 55 and the groups of pile warp 21 appear in dents 55 and 54. In dent 54 the pile warp end of pile warp 20 is always to the right of the pile warp end of pile warp 21. In dent 55 the pile warp end of pile warp 20 is always to the left of the pile warp end of pile warp 21.

It will thus be understood that the reversal of the side-most ends of the groups causes the separation of the groups.

The same relationship which occurs in the dents above referred to as to the weave persists in the courses of the fabric.

In view of my invention and disclosure variations and modifications to meet individual whim or particular need will doubtless become evident to others skilled in the art, to obtain all or part of the benefits of my invention without copying the method shown, and I, therefore, claim all such insofar as they fall within the reasonable spirit and scope of my claims.

Having thus described my invention what I claim as new and desire to secure by Letters Patent is:

1. The method of weaving a pile fabric, which comprises threading in a series of groups of ends of first pile warps in adjoining dents with ends-out in dents between the groups of ends-in, and a series of groups of ends of a second pile warp in adjoining dents, with ends-out in dents between groups of ends-in, dents having ends-in of the first pile warp corresponding except at the side of the groups to dents having ends-out of the second pile warp, and at at least one side of each group of the first pile warp, there being an end-in in the same dent which has an end-in of the adjoining group of the second pile warp, interweaving the pile warps with at least one binder warp, at least one stuffer warp and wefts, and in the interweaving raising the first pile warp first over a cutting wire, then raising the second pile warp over a wire, then raising the first pile warp over a noncutting wire having high and low portions within the shed, pulling the wires in the sequence named and by the pulling of the wire having high and low portions within the shed exposing in the face of the pile an abnormally high cut tuft in the row formed by the cutting wire having the high and low portions within the shed.

2. The method of weaving a pile fabric, which comprises threading in a series of groups of ends of first pile warps in adjoining dents, with ends-out in dents between the groups of ends-in, and a series of groups of ends of a second pile warp in adjoining dents, with ends-out in dents between groups of ends-in, dents having ends-in of the first pile warp corresponding except at the side of the groups to dents having ends-out of the second pile warp, and at both sides of each group of the first pile warp, there being an end-in in the same dent which has an end-in of the adjoining group of the second pile warp, interweaving the pile warps with at least one binder warp, at least one stuffer warp and wefts, and in the interweaving raising the first pile warp first over a cutting wire, then raising the second pile warp over a wire, then raising the first pile warp over a noncutting wire having high and low portions within the shed, pulling the wires in the sequences named and by the pulling of the wire having high and low portions within the shed exposing in the face of the pile an abnormally high cut tuft in the row formed by the cutting wire having the high and low portions within the shed.

3. The method of weaving a pile fabric having symmetrical islands of pile over the face of the fabric, which comprises threading in a series of symmetrical lateral groups of ends of a first pile warp in adjoining dents with an end-out of the first pile warp in at least one dent between each group, threading in a series of symmetrical lateral groups of ends of a second pile warp in adjoining dents with an end-out of the second pile warp in at least one dent between each group, the centers of the groups of the ends of the first pile warp corresponding in lateral position with the edges of the groups of the ends of the second pile warp and the ends-out of each pile warp corresponding in position with the middle of the groups of the other pile warp, interweaving the pile warps with at least one binder warp, a stuffer warp and wefts while raising the pile warps alternately over pile wires, and pulling out the wires and crowding the pile into a series of symmetrical islands spread over the face of the fabric.

4. The method of claim 3, in which the relative lateral positions of particular corresponding ends of the first and second pile warp in the same dent are reversed at different lateral positions in the same group.

5. The method of claim 4, in which the corresponding ends of the first pile warp and of the second pile warp in the same dent are on opposite sides of one another at opposite sides of each group.

6. The method of claim 3, in which the dents having ends-in of the first pile warp correspond except at the sides to the dents having ends-out of the second pile warp, and at least one side of each group of the first pile warp, there is an end-in in the same dent which has an end-in of the adjoining group of the second pile warp.

7. The method of claim 6, in which at both sides of each group of the first pile warp there is an end-in in the same dent which has an end-in of the adjoining group of the second pile warp.

8. The method of weaving a pile fabric having symmetrical islands of pile over the face of the fabric, which comprises threading in a series of ends of a first pile warp in adjoining dents with an endout of the first pile warp in at least one dent between each group, threading in a series of lateral groups of ends in a second pile warp of adjoining dents with an endout of a second pile warp in at least one dent between each group, the groups of the ends of the first pile warp being in staggered relation to the groups of the ends of the second pile warp, the dents having ends-in of the first pile warp corresponding except at the sides to the dents having endsout of the second pile warp and at only one side of each group of the first pile warp there being an endin in the same dent which has an endin of the adjoining group of the second pile warp, interweaving the pile warps with at least one binder warp, a stuffer warp and wefts while raising the pile warps alternately over pile wires, and pulling out the wires and crowding the pile into a series of islands spread over the face of the fabric.

9. The method of weaving a pile fabric having islands of pile over the face of the fabric, which comprises threading in a series of lateral groups of ends of a first pile warp in adjoining dents with an endout of the first pile warp in at least one dent between each group, threading in a series of symmetrical lateral groups of ends of a second pile warp in adjoining dents with an endout of the second pile warp in at least one dent between each group, the groups of the ends of the first pile warp being in staggered relation to the ends of the groups of the second pile warp and the endsout of each pile warp corresponding in position with the middle of the groups of the other pile warp, the dents having endsin of the first pile warp corresponding except at the sides with the dents having endsout of the second pile warp and at at least one side of each group of the first pile warp there being an endin in at least two adjoining dents which has an endin of the adjoining group of the second pile warp, interweaving the pile warps with at least one binder warp, a stuffer warp and wefts while raising the pile warps alternately over pile wires, and pulling out the wires and crowding the pile into a series of islands spread over the face of the fabric.

10. The method of weaving a pile fabric having islands of pile over the face of the fabric, which comprises threading in a series of lateral groups of ends of a first pile warp in adjoining dents with an endout of the first pile warp in at least one dent between each group, threading in a series of lateral groups of ends of a second pile warp in adjoining dents with an endout of the second pile warp in at least one dent between each group, the groups of the first pile warp being in staggered relation laterally with the groups of the second pile warp, there being no end whatever of one pile warp in the dents where ends are out, interweaving the pile warps in opposition to one another, with at least one binder warp, a stuffer warp and wefts while raising the pile warps alternately over pile wires, and pulling out the wires and crowding the pile into a series of islands spread over the face of the fabric.

11. The method of weaving a pile fabric having islands of pile distributed over the face of the fabric, which comprises threading in a first pile warp through the reed with only one end of the first pile warp in each dent of the reed in which it appears, threading in a second pile warp through the reed with only one end of the second pile warp in each dent of the reed in which it appears, the first pile warp and the second pile warp appearing in the same dents at at least certain positions weftwise, reversing the weftwise relation of the ends of the first pile warp and the second pile warp to one another in particular dents to form a succession of symmetrical lateral groups, each consisting of a plurality of pile warp ends which are in adjoining dents and there being between each group at least one endout of the particularlar pile warp, reversing the lateral relationship of the ends of the first pile warp and the second pile warp in a particular dent on opposite sides of each group, interweaving the pile warps with at least one binder warp, a stuffer warp, and wefts while raising the pile warps alternately over wires, and pulling the wires and thereby crowding the pile into islands over the face of the fabric.

12. The method of weaving a pile fabric, having islands of pile distributed over the face of the fabric, which comprises threading in a first pile warp through the reed with only one end of the first pile warp in each dent of the reed in which it appears, threading in a second pile warp through the reed with only one end of the second pile warp in each dent of the reed in which it appears, the first pile warp and the second pile warp both appearing in a plurality of consecutive dents, reversing the weftwise relation of the ends of the first pile warp and the second pile warp to one another in different adjoining dents, each of which contains an end of both the first and second pile warp, interweaving the pile warps with at least one binder warp, stuffer warp and wefts while raising the pile warps alternately over wires, and pulling the wires and thereby producing islands of associated pile projections in pairs in the fabric.

13. The method of claim 12, which comprises reversing the weftwise relation of the ends of the first pile warp and the second pile warp in alternate dents and thereby forming symmetrical islands which are evenly balanced.

References Cited in the file of this patent

UNITED STATES PATENTS

| | | |
|---|---|---|
| 2,609,839 | Groat | Sept. 9, 1952 |
| 2,670,013 | Groat | Feb. 23, 1954 |
| 2,674,269 | Groat | Apr. 6, 1954 |
| 2,700,401 | Smiley | Jan. 25, 1955 |
| 2,708,457 | Gebert | May 17, 1955 |
| 2,708,458 | Gebert | May 17, 1955 |
| 2,714,399 | Hoeselbarth | Aug. 2, 1955 |
| 2,714,902 | Hoeselbarth | Aug. 9, 1955 |
| 2,754,850 | Hoeselbarth | July 17, 1956 |